United States Patent [19]

Buxton

[11] Patent Number: 4,588,882
[45] Date of Patent: May 13, 1986

[54] SKEW DETECTION SYSTEM FOR OPTICALLY READ DATA

[75] Inventor: James L. Buxton, East Palo Alto, Calif.

[73] Assignee: Drexler Technology Corporation, Mountain View, Calif.

[21] Appl. No.: 617,630

[22] Filed: Jun. 6, 1984

[51] Int. Cl.⁴ .............................................. G06K 19/00
[52] U.S. Cl. ..................................... 235/487; 235/491; 235/493; 235/494
[58] Field of Search ................. 235/487, 491, 493, 494

[56] References Cited

U.S. PATENT DOCUMENTS 3,700,862 10/1972 Snook et al.
3,739,154 6/1973 Corcoran.
4,201,339 5/1980 Gunn .................................... 235/491
4,337,394 6/1982 Fukushima ..................... 250/237 G Primary Examiner—Harold I. Pitts

[57] ABSTRACT

A skew correction system for data media, especially optical data storage media wherein a pair of identical geometric marks are spaced apart in a band or track parallel to a data track, the data tracks being transverse to the directions of relative motion of the data storage medium with respect to a detector. As the medium moves relative to the detector, a linearly scanning detector, portions of each geometric mark are observed by the detector. A ratio of picture elements is determined using the two sets of observed picture elements. If the ratio is other than 1, skew exists. A closed-loop servo system is used to restore the ratio to 1, thereby eliminating skew. The geometric marks may be disposed forward of the data tracks, astride the data tracks, behind the data tracks, interspersed with the data tracks, or if different colors of light are used, atop the data tracks.

16 Claims, 9 Drawing Figures

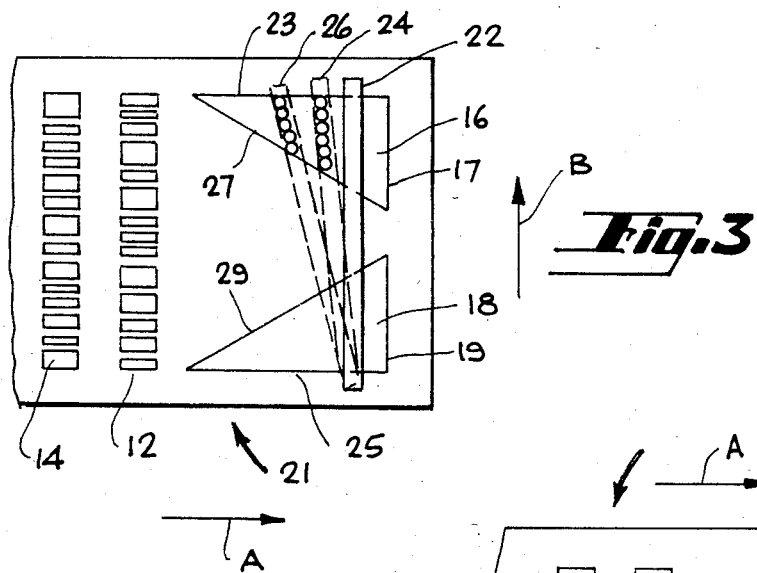
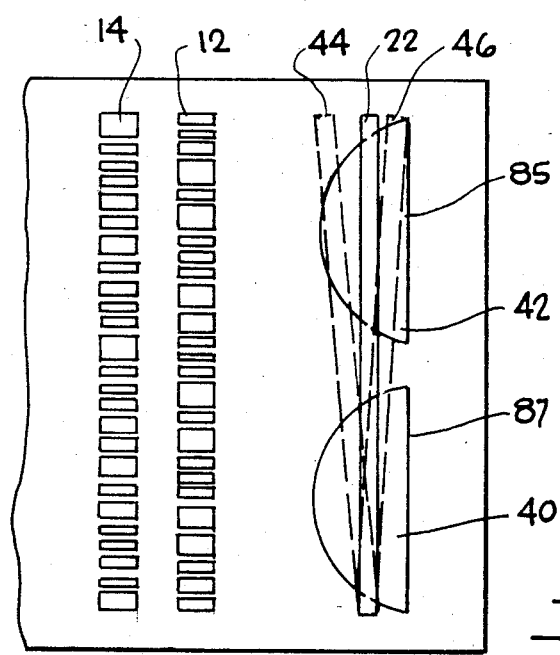
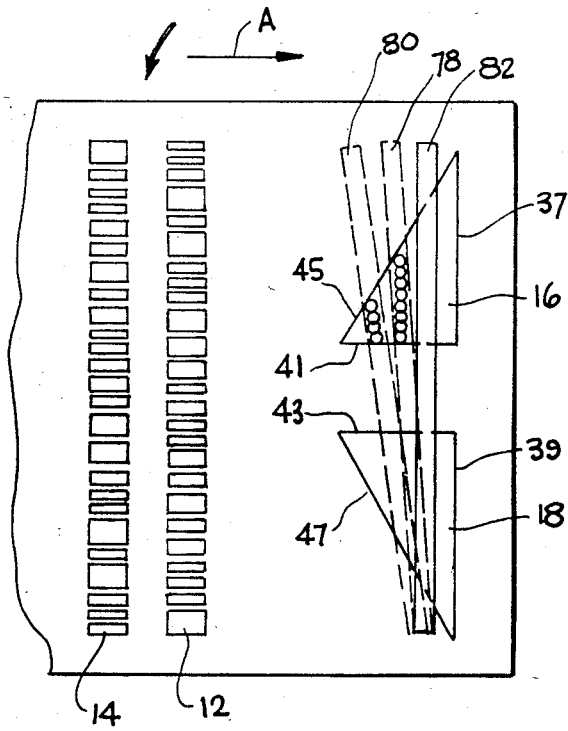

4,588,882

SKEW DETECTION SYSTEM FOR OPTICALLY READ DATA

TECHNICAL FIELD

The invention relates to reading of optical data storage media and in particular to skew detection for aligning the position of an optical detector relative to optically detectable data tracks on a data storage medium.

BACKGROUND ART

During scanning of a recorded optically detectable data track the alignment of the detector with the data track has been controlled by adjacent, parallel, optical servo tracks or marks, the sensing of which directs a servo motor to retain a detector on the data track. In U.S. Pat. No. 3,739,154, the skew position of a linear array transverse to the multiple data tracks being read simultaneously, is detected by the sequence of the passage of the track centers past the individual detectors in the array. The tracking error signal is delivered to a servo to correct the track position at the start of the scan. Logic and switching circuits are employed to correct for tracking errors and provide readout of the same track during the multiple track scan.

In U.S. Pat. No. 4,337,394, detection of parallel solid or broken lines and bars on a support plate give indication and direction of skew position of the perpendicularly disposed solid state line image sensor of a line-by-line image dissecting system.

In U.S. Pat. No. 3,700,862, the skew of multiple magnetic-type reading heads relative to transversely located multiple data tracks is detected by the alignment of the pulses from parallel data and clock tracks running in pairs of the upper and lower longitudinal margins of the card.

When data tracks are placed in rows perpendicular to the direction of motion of the recording medium material, it is possible to image the data in the entire row without the need for track following. However, the detector must be aligned with the data track during movement of the recording medium below the detector. If the detector is skewed beyond a certain limit is is possible that the detector will incorrectly read a part of an adjoining track.

It is therefore the object of the invention to device a means for detecting both direction and angle of skew of a linearly scanning detector relative to rows of data tracks aligned perpendicular to the direction of travel of the recording medium.

DISCLOSURE OF THE INVENTION

The above object has been achieved in an optical data storage material having rows of prerecorded optically detectable data tracks in which the start of such rows is preceded by spaced-apart pairs of optically detectable, symmetric, geometric marks. The configuration of the marks is such that in perfect alignment with a data track, a detector overlying a pair of marks will observe the same length "slices" of the marks, i.e., the same extent of transverse portions of the marks. Skew of the detector relative to the marks is indicated by the ratio of two portions of the marks under observation. The shape of each mark varies as a function of position along the direction of travel. Direction of skew may also be determined. The marks may be either reflective against a non-reflective background or opaque against a transmissive background.

Sensitivity to the degree of skew may be increased by increasing the pitch at which the detector crosses the marks, i.e. the rate at which the angle between the detector increases or decreases along the direction of travel of the detector, for example by providing spaced-apart pairs of identical triangles with steep sides. Since the marks are placed parallel to the rows of data tracks, adjusting the alignment of the detector until the ratio of the extent of portions of the marks observed is equal, will automatically align the detector with the data tracks.

Pairs of these skew detection marks may be lined up alongside optically detectable indicating bars. The optically detectable bars have a common dimension with the marks along the direction of travel. By intersecting these bars in addition to the marks, the detector array may attain a higher sensitivity measurement of skew by using marks with a steeper pitch.

The marks may be shaped as triangles, polygons or circular segments as long as the intercepting detector can observe a scan of portions of each mark. The cross sectional variation of the marks at the detector should be the same in the absence of skew. The marks need not be identical since a computer could take into account differences in scale. However, the marks should be geometrically related, such as similar triangles, as opposed to congruent triangles.

The detector used to observe the marks is a scanning detector, preferably a linear array. Signals from the detector, upon scanning the geometric marks, are compared to each other and any difference represents an error signal. The error signals are used in a closed loop servo system to provide corrective feedback to a moveable element. This movable element may compensate for skew by realigning either the data storage medium or the detector or rejecting the data storage medium and requiring reentry into the reading apparatus.

BRIEF DESCRIPTION OF THE DRAWINGS

FIGS. 3 and 4 are different configurations of pairs of skew detection marks on an optical data storage medium with a detector observation pattern superimposed.

FIG. 6 is an alternative embodiment of the skew detector marks on a data card in accord with the present invention.

FIG. 7 is a simplified electrical plan of a servo system for applying corrective feedback in a skew detection and correction system.

BEST MODE FOR CARRYING OUT THE INVENTION

Figure 1:
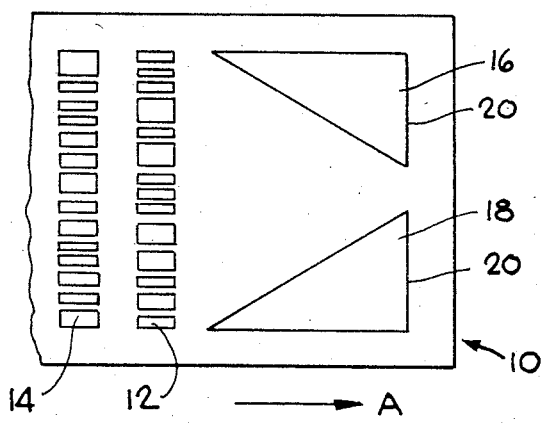
FIG. 1 is a plan view of an optical data storage medium having skew detection marks in accord with the present invention.

With reference to FIG. 1, an optical data storage medium 10 is shown. Such a medium is typically a strip carried on a card, similar to a magnetic strip on a credit card. However, the medium may cover the entirety of the card, if desired. The strip has a lengthwise direction indicated by arrow A, with data written in tracks transverse, in this case perpendicular, to the lengthwise direction. Two rows of data tracks 12 and 14 consist of prerecorded data information. Proximate to the first data track are two prerecorded optically detectable skew detection marks 16 and 18. Both the data tracks and the marks may have the same optical characteristic or different characteristics, the only requirement being that they be optically detectable from the background material of the optical recording media. The pair of skew detection marks 16 and 18 are in parallel alignment with the data tracks so that the same detector which detects the marks also detects the data tracks. As shown in FIG. 1 the skew detection marks are a pair of triangles having transverse sections of decreasing width, i.e. detector slices, with the direction of travel A of the card. Two approximately equal length sides 20 of the triangles are located equidistant from the first row of data tracks. The sectional width of one mark is identical to that of the other mark at each corresponding point along the direction A of travel of the medium relative to a detector.

Figure 2A:
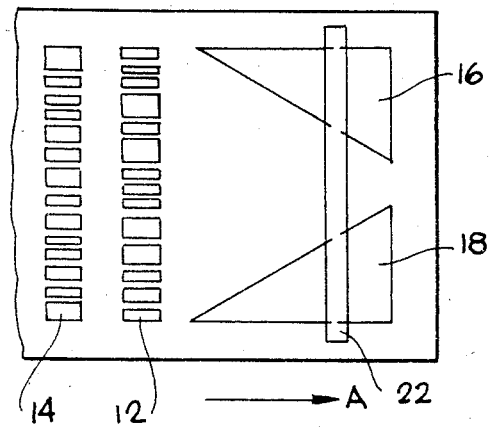
FIGS. 2a, 2b, and 2c are plan view of an optical data storage medium having skew detection marks with an observation detector pattern spanning both marks.

FIGS. 2a, b and c show the method of skew measurement of the optical data recording medium relative to a fixed detector array scanning the card. In FIG. 2a the detector pattern 22 spans both skew detection marks. The portion of mark 16 detected by a linear scanning detector is identical to the amount detected on mark 18 by the detector. This indicates a null condition of skew in which equal portions of each mark are detected in a detector. For example, in a CCD linear array an equal number of picture elements would be detected in different regions of the linear array. A typical CCD detector array may contain from a few dozen to a few thousand elements, or more.

Figure 2B:
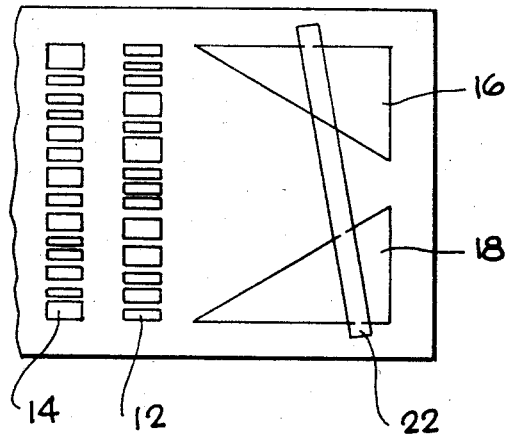
Figure 2C:
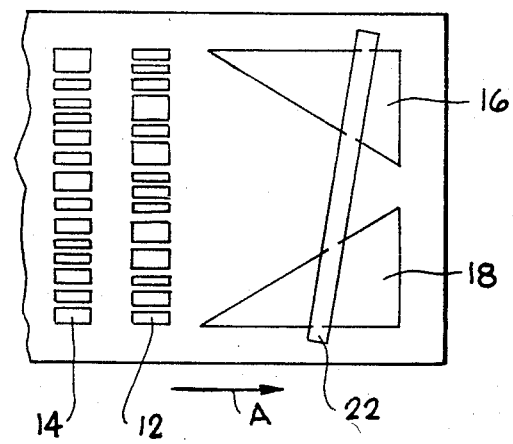

Skew of a detector pattern to the left is shown in FIG. 2b. The number of picture elements in the detector pattern 22 activated by mark 16 is less than the number activated by the cross section of mark 18. Thus the ratio will no longer be 1:1 and a skew indication to one direction is detected by the smaller signal from mark 16. A skew position of the detector in the opposite direction is shown in FIG. 2c wherein the number of picture elements activated by the mark 16 is greater than the number of elements that would be activated by mark 18. As shown, the cross section or width of each of the marks changes in the lengthwise direction of the medium, i.e., with travel of the medium in direction A under the detector array. Due to this decreasing cross section, skew either to the left or to the right will readily be detected by the difference in cross section measured.

In FIG. 3, a portion of an elongated data storage medium 21 may be seen. The lengthwise direction of the medium is indicated by the arrow A while the perpendicular width of the medium is indicated by the arrow B. The medium has preformatted data in tracks in the widthwise direction, i.e. parallel to arrow B. For example, tracks 12 and 14 show digital data resembling bar code. However, the data is greatly magnified. Typically, optically written data may have a size on the order of approximately 20 to 50 microns in the lengthwise direction. Typically, hundreds of data spots would form a track, although more or less data spots could be organized into a track. It is important to align a scanning detector with the track. For this purpose, a pair of geometrically related marks, such as triangles 16 and 18 are placed on the card, by a photographic process, by a printing process or by a labelling process. If the data spots in tracks 12 and 14 are photographically recorded, the geometric marks 16 and 18 may be simultaneously recorded by means of masks.

In any event, the marks have a defined relationship with respect to the tracks. In the example of FIG. 3, the two marks are identical in shape, but opposite in orientation with the forward edges 17 and 19 colinear with each other, the lateral edges 23 and 25 parallel with each other and aligned with the lateral edges of each data track. Moreover, the lateral edges have the same lengthwise extent, as with the forward edges 17 and 19. The respective hypotenuses 27 and 29 are of equal length and inclined at equal angles, but opposite in orientation.

The general scanning pattern of a detector is indicated by a rectangle 22 which extends in the widthwise direction, parallel to the data tracks and transverse, in this case perpendicular, to the lengthwise direction of the medium. The detector may be a CCD linear array or the linear sweep of a scanning laser beam. In the case of a CCD array, a number of light sensing picture elements is disposed uniformly along a line from one end of rectangle 22 to the opposite end. The geometric marks 16 and 18 are made optically contrasting with respect to the background, for example black on a clear or reflective surface so that portions of the marks under the picture elements may be observed. Since rectangle 22 cuts across equal portions of the marks 16 and 18, the same number of picture elements will observe portions of each mark. Thus, the ratio of picture elements is 1:1. This is not the case indicated by dashed line 24 in whcih there is a slight amount of skew. In this case, there will be a greater number of picture elements observing portions of mark 16 than the number of picture elements observing a portion of mark 18. Here the ratio is unbalanced and the direction of skew may be sensed by determining where the number of picture elements is greater compared to the other. An even greater amount of skew is indicated by dashed line 26 where the ratio of picture elements would be even further unbalanced.

FIG. 4 is similar to FIG. 3, except that the orientation of the geometric marks 16 and 18 has been changed. Once again, forward edges 37 and 39 are spaced apart, but colinear. These forward lines now correspond to the width of the triangles which form the geometric marks while the corresponding altitude members 41 and 43 are parallel to the lengthwise direction of the recording medium 21, indicated by the arrow A. The altitudes are of equal length, spaced apart and parallel. Corresponding hypotenuses 45 and 47 are also of equal length, but sloping in opposite direction at equal angles. The orientation of the geometric marks shown in FIG. 4 yields a greater number of picture elements in a scanning pattern of a linear array detector indicated by rectangle 82. When this rectangle is skewed slightly, as indicated by the dashed line 78, a greater number of picture elements observes a portion of the skewed mark than with the portions depicted in FIG. 3. Similarly, even with the greater skew angle indicated by block 80, there is an opportunity for more picture elements to detect the geometric marks. While the data tracks 12 and 14, parallel to forward lines 37 and 39, appear to be wider than in FIG. 3, this need not be the case. However, if wider tracks are used, it is desirable that the geometric marks be correspondingly wider to preserve or enhance the opportunity of the detector to observe any deviation in the ratio of portions of the marks observed by the detector.

While there is increased sensitivity in the alignment presented in FIG. 4, there is a penalty which exists if the card moves too fast. At high speed, there is less opportunity for the detectors to observe the marks 16 and 18. On the other hand, with the orientation shown in FIG. 3, there is greater opportunity to observe the geometric patterns 16 and 18 at high recording medium velocities in the direction of arrow A. In both FIGS. 3 and 4 the geometric patterns are shown in separate portions of the recording medium. It is possible then to locate the geometric marks alongside the data tracks, instead of in a header or follower location. Moreover, by using appropriate inks or dyes it is possible to superimpose the geometric marks on top of the data. For example, if the data spots were transmissive of red and green light, but the geometric marks were transmissive only of green light, red and green light sources could be used sequentially to identify the location of the geometric marks.

Figure 5:
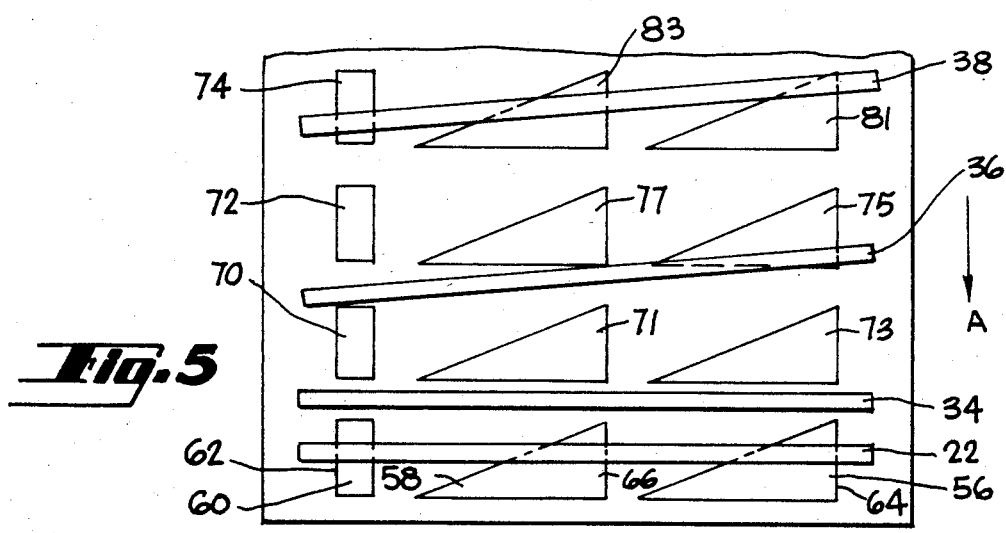
FIG. 5 is a plan view of multiple skew detection marks and indicating bars on an optical data storage medium with a detector pattern superimposed.

With reference to FIG. 5, a portion of a recording medium is illustrated, the portion having only a header section with the geometric marks of the present invention. The header section is moving in the direction indicated by the arrow A beneath a scanning pattern indicated by the rectangle 22. In this case, a pair of geometric marks, 56 and 58 is positioned with similar orientation, while a third mark 60, termed an indicator bar is alongside the geometric marks. Indicator bar 60 has an altitude dimension 62 which is parallel to the altitudes 64 and 66 of the geometric marks. The purpose of the indicator marks 60, 70, 72 and 74 is to signal the presence of geometric marks aligned with the indicator mark. For example, indicator mark 70 would signal the supposed presence of geometric marks 71 and 73 if there were no skew or only slight skew. From FIG. 5, it may be seen that the geometric marks may form tracks of their own, the presence of each track being signalled by an indicator bar. Multiple tracks of the type shown in FIG. 5 are especially useful where the card is moving at relatively high velocity or where it is desirable to verify a correction for skew. The pattern scanned by a linear scanning detector is shown by the rectangular block 22 moving over indicator mark 60 and geometric marks 58 and 64. As the indicator bar passes over the geometric marks, it will encounter a clear zone indicated by the rectangular block 34. If the card carrying the recording medium is skewed with respect to the detector, a situation such as that shown by the rectangular block 36 may occur. In this case, a geometric mark 75 is encountered, but the mark 77 is not encountered, nor is indicator bar 72. In this case, the degree of error is sufficiently great, that either a correction must be made or subsequently read data must be disregarded until better alignment is obtained. The error detected by the light detected from detector 36 may be corrected by servo control of the medium, using data obtained by the detector. It may be necessary to bring the detector over the marks, as indicated by the rectangle 38, observing detector marks 81 and 83 to determine the ratios between the geometric marks which govern the extent of correction required. In this situation, the indicator spot 74 confirms that the detector should be observing two marks. The reading that is obtained over geometric marks 81 and 83 is ideal for computing an error signal for applying servo correction.

FIG. 6 shows that triangles are not the only shape that may be used. The geometric marks 40 and 42 are geometrically identical, with straight line portions 85 and 87 which are colinear and parallel to data tracks 12 and 14. The marks are circular sectors which have a lengthwise dimension in the direction of travel of the medium, corresponding to the arrow A. The width of each mark, perpendicular to the length, varies as a function of the length, gradually becoming narrower from the front edge lines 85 and 87 rearwardly. This allows the scanning pattern of a detector, indicated by rectangle 22, to indicate skew. Dashed line 44 indicates one alignment where ratios of detector elements or picture elements may be established for computing skew. Similarly, the rectangle indicated by dashed line 46 shows skew in the opposite direction. The ratios may be computed either by a microprocessor or by dedicated hardward or software.

A simple feedback system is indicated in FIG. 7 wherein a command signal 91 is applied to a summing node 93. The purpose of the command signal is to drive a skew correcting motor 95 in a manner such that a null signal is obtained. This may be established at the outset by a nominal command signal which represents the midpoint between opposite corrective extents. Once a detector is moved relative to the length of the card, observing the header section of a card where geometric marks in accord with the present invention may be found, a linear scanning detector will observe portions of two geometric marks. The detector and associated electronics are represented by block 97. The signals obtained from the detector are used to compute a ratio which if other than 1:1 forms an error signal which may be positive or negative, depending on the direction of skew. This error signal generation is indicated by block 99 and the output error is fed to the summing node 93 where the feedback signal is combined with the command signal to change the skew motor 95 to another position, driving a movable element, which eliminates the error signal. If the amount of error is excessive, beyond a preset amount, a data card is rejected and re-entry is required. The preset amount corresponds to the corrective limits of the system.

I claim:

1. A skew correction system for an elongated optical data storage medium comprising,
    an elongated optical data storage medium having data tracks transverse to the length of the medium,
    a pair of geometrically related marks disposed on the medium having a width dimension which varies as a function of the lengthwise dimension, the marks disposed in a known relation to the tracks and in parallel alignment therewith,
    means for linearly scanning said data tracks and said marks,
    means for detecting geometric deviations between the pair of marks along a linear scan of the medium and producing a deviation signal in response thereto, and
    servo means for changing the alignment of said scanning means relative to the data tracks using said deviation signal.

2. The system of claim 1 wherein said geometrically related marks are triangles having two long sides and a vertex, the long sides being in generally the same direction as the length of the medium.

3. The system of claim 1 wherein said geometrically related marks are triangles having two long sides and a vertex, the long sides being in generally the same direction as said data tracks.

4. The system of claim 1 where said geometrically related marks are located in an area on said storage medium preceeding said data tracks.

5. The system of claim 1 wherein an indicating mark is disposed in parallel alignment with said geometrically related marks, said indicating bar having the same length as said geometrically related marks.

6. The system of claim 1 wherein said data storage medium is a light reflective medium.

7. The system of claim 1 wherein said data storage medium is a light transmissive medium.

8. The system of claim 1 wherein said means for linearly scanning said data tracks is a CCD linear array.

9. The system of claim 1 wherein said means for linearly scanning said data tracks is a laser.

10. A data card for use in an optical data storage system having skew correction apparatus comprising,
an elongate optical data storage medium having data tracks transverse to the length of the medium, said data storage medium disposed on a data card, and
a pair of geometrically related marks disposed on the medium having a width dimension which varies as a function of the lengthwise dimension, the marks disposed in a known relation to the tracks and in parallel alignment therewith.

11. The system of claim 10 wherein said geometrically related marks are triangles having two long sides and a vertex, the long sides being in generally the same direction as the length of the medium.

12. The system of claim 10 wherein said geometrically related marks are triangles having two long sides and a vertex, the long sides being in generally the same direction as said data tracks.

13. The system of claim 10 where said geometrically related marks are located in an area on said storage medium preceeding said data tracks.

14. The system of claim 10 wherein an indicating mark is disposed in parallel alignment with said geometrically related marks, said indicating bar having the same length as said geometrically related marks.

15. The system of claim 10 wherein said data storage medium is a light transmissive medium.

16. A method of skew correction for data cards of the type having stored information in bit patterns recorded in tracks on elongated stips, the tracks transverse to the length of the strips, the method comprising,
disposing geometrically identical pairs of marks on a data card in parallel alignment with the data tracks, the marks having a width dimension which varies as a function of length,
scanning said tracks and said marks in parallel scans,
determining the ratio of portions of each mark detected in a scan, and
reorienting the relative position of said scans with said tracks until said ratio is one.

* * * * *

UNITED STATES PATENT AND TRADEMARK OFFICE
CERTIFICATE OF CORRECTION

PATENT NO. : 4,588,882

DATED : May 13, 1986

INVENTOR(S) : James L. Buxton

It is certified that error appears in the above—identified patent and that said Letters Patent is hereby corrected as shown below:

Column 1, line 36, "pairs of the upper" should read - -pairs on the upper- -.

Column 1, line 44, "limit is is" should read - -limit it is- -.

Column 1, line 47, "to device" should read - -to devise- -.

Column 4, line 31, "in whcih" should read - -in which- -.

Claim 10, column 7, line 19, "an elongate optical data storage medium" should read - -an elongated optical data storage medium- -.

Claim 16, column 8, line 18 "on elongated stips" should read - -on elongated strips- -.

In the Abstract, line 5, "to the directions" should read - -to the direction- -.

Signed and Sealed this

First Day of November, 1988

Attest:

DONALD J. QUIGG

*Attesting Officer*       *Commissioner of Patents and Trademarks*